(12) United States Patent
Barber et al.

(10) Patent No.: US 12,001,925 B2
(45) Date of Patent: Jun. 4, 2024

(54) PREPARATION OF QUBITS

(71) Applicant: RIVERLANE LTD, Cambridge (GB)

(72) Inventors: Ben Barber, Cambridge (GB); Jacob M Taylor, Cambridge (GB); Neil Ian Gillespie, Cambridge (GB)

(73) Assignee: RIVERLANE LTD, Cambridge (GB)

( * ) Notice: Subject to any disclaimer, the term of this patent is extended or adjusted under 35 U.S.C. 154(b) by 86 days.

(21) Appl. No.: 17/659,277

(22) Filed: Apr. 14, 2022

(65) Prior Publication Data
US 2023/0334357 A1   Oct. 19, 2023

(51) Int. Cl.
*G06N 10/70* (2022.01)
*G06N 10/20* (2022.01)

(52) U.S. Cl.
CPC .............. *G06N 10/70* (2022.01); *G06N 10/20* (2022.01)

(58) Field of Classification Search
None
See application file for complete search history.

(56) References Cited

U.S. PATENT DOCUMENTS

| | | | | |
|---|---|---|---|---|
| 11,294,797 | B1* | 4/2022 | Naveh | G06N 10/80 |
| 2020/0274554 | A1* | 8/2020 | Aspuru-Guzik | G06N 10/00 |
| 2020/0401478 | A1* | 12/2020 | Reilly | G06N 10/00 |
| 2020/0401927 | A1* | 12/2020 | Nickerson | G06F 13/40 |
| 2021/0125096 | A1* | 4/2021 | Puri | H04L 1/04 |
| 2021/0391873 | A1* | 12/2021 | Zheng | G06N 3/045 |
| 2022/0029639 | A1* | 1/2022 | McClean | G06N 10/00 |
| 2022/0092462 | A1* | 3/2022 | Huai | G06N 10/40 |
| 2022/0101173 | A1* | 3/2022 | Alexander | G06N 10/00 |
| 2022/0114471 | A1* | 4/2022 | Vacon | G06N 10/70 |
| 2022/0230088 | A1* | 7/2022 | Chen | G06N 10/70 |
| 2022/0245500 | A1* | 8/2022 | Montanaro | G06N 20/00 |

OTHER PUBLICATIONS

Strekalov D. V. et al. "Postselection-free energy-time entanglement". Phys. Rev. A 54, R1(R)—Published Jul. 1, 1996.*
"Ancilla bit". Wikipedia, retrieved on Oct. 12, 2023 from: https://en.wikipedia.org/wiki/Ancilla_bit.*
International Search Report for International Application No. PCT/GB2023/051008 dated Jul. 7, 2023.
Inada et al. "Measurement-free ultrafast quantum error correction by using multi-controlled gates in higher-dimensional state space." arXiv preprint arXiv:2109.00086, Aug. 31, 2021.
Ercan et al. "Measurement-free implementations of small-scale surface codes for quantum-dot qubits." Physical Review A 97.1 (2018): 012318, Aug. 29, 2017.
Barber et al. "Post-selection-free preparation of high-quality physical qubits." arXiv preprint arXiv:2209.05391, Sep. 15, 2022.

* cited by examiner

*Primary Examiner* — Steve N Nguyen
(74) *Attorney, Agent, or Firm* — MASCHOFF BRENNAN

(57) ABSTRACT

A computer-implemented postselection-free method of initializing qubits in a quantum computer, comprising: preparing at least one data qubit and a plurality of auxiliary qubits in respective initial states, wherein each of the at least one data qubit and the plurality of auxiliary qubits has a respective probability of being prepared with an error; and, performing a plurality of non-measurement multi-qubit quantum logic operations that propagate errors between the at least one data qubit and the plurality of auxiliary qubits so as to reduce the probability of an error affecting the at least one data qubit.

8 Claims, 14 Drawing Sheets

1601 — Prepare at least one data qubit and a plurality of auxiliary qubits in respective initial states.

1602 — Perform non-measurement multi-qubit quantum logic operations that propagate errors between the at least one data qubit and the plurality of auxiliary qubits.

PREPARATION OF QUBITS

BACKGROUND

Physical implementations of quantum computers can now reliably achieve two-qubit gate fidelities above 99.7%, and state preparation and measurement (SPAM) errors have become the dominant sources of error in such systems.

SPAM errors have become straightforward to calibrate and, in software, ameliorate using multiple runs of a given circuit, and more recently, using more complex quantum post-processing stages to more reliably estimate observables of interest.

However, SPAM errors still present a significant obstacle to implementing fault-tolerant (i.e. error corrected) quantum computation. Preparation and measurement of auxiliary syndrome qubits is ubiquitous in such computations, so error correction performance will be severely limited by SPAM errors.

Existing procedures mitigate against SPAM errors by using postselection to initialize qubits with reduced error rates, but such postselection greatly complicates the scheduling of processes such as quantum error correction syndrome extraction. There is therefore a need for improved procedures for reducing SPAM errors that avoid the complex scheduling requirements that result from the use of postselection.

SUMMARY OF EXAMPLE EMBODIMENTS

According to a first example, there is provided a computer-implemented postselection-free method of initializing qubits in a quantum computer, comprising, for example, preparing at least one data qubit and a plurality of auxiliary qubits in respective initial states, wherein each of the at least one data qubit and the plurality of auxiliary qubits has a respective probability of being prepared with an error; and, performing a plurality of non-measurement multi-qubit quantum logic operations that propagate errors between the at least one data qubit and the plurality of auxiliary qubits so as to reduce the probability of an error affecting the at least one data qubit.

In the example embodiment, the data qubits are the qubits that are to be used for computation, whereas the auxiliary qubits are qubits which are used as part of the initialization process but are not subsequently used for computation (at least not until they are reinitialized).

In the example, the resulting error rate on the data qubit is lower than if the data qubit was prepared without performing an error mitigation procedure. While the error rates on the auxiliary qubits may increase, the auxiliary qubits can be disregarded and only the data qubit used for subsequent quantum computation. This example method reduces the error rate on the data qubit without requiring any postselection or measurement, which removes the need for complex scheduling algorithms that rely on probabilistic postselection methods and/or slow measurement operations.

In disclosed embodiments, a method acts directly on the qubits (i.e. at the architecture level of the quantum computer) and can be used to reduce the qubit initialization error rate (and therefore the error rate as a whole) for any algorithm performed on the quantum computer. In other words, disclosed methods reduce the underlying error rate of the quantum computer itself and results in the quantum computer running more effectively as a quantum computer.

Postselection-free means that the success of the method is not dependent upon a measurement outcome of any of the qubits (i.e. it does not require postselection), unlike existing methods that utilize postselection to mitigate against qubit preparation errors.

As explained later, the plurality of non-measurement multi-qubit quantum logic operations can be represented by a quantum circuit, and there are numerous such quantum circuits that can be used to propagate errors between the at least one data qubit and the plurality of auxiliary qubits so as to reduce the probability of an error affecting the at least one data qubit.

For example, the plurality of non-measurement multi-qubit quantum logic operations may comprise the operations illustrated in any of FIG. 2, 3a, 3b, 4, 5a, 5b, 6, 7, 11 or 14, or any logically equivalent circuit (e.g. circuits in which the order of commuting gates has been changed). As will be understood by a person skilled in the art, these figures represent quantum circuit diagrams which cannot be clearly defined by words.

Logically equivalent refers to circuits that e.g. perform that same permutation of the computational basis (such circuits may also include additional gates that act upon the auxiliary qubits but do not affect the data qubit).

The respective probability of being prepared with an error may be greater than 0 and less than 0.5.

Reducing the probability of an error affecting the at least one data qubit implicitly restricts the probability of error to being within a range of threshold values that depends upon the multi-qubit quantum logic operations being performed and the error rate (or fidelity) of the multi-qubit quantum logic operations (or equivalently, it implicitly restricts that error rate of the multi-qubit quantum logic operations to being less than a threshold value that depends upon the preparation error rate and the multi-qubit quantum logic operations being performed). The exact value of the threshold values will vary depending upon the complexity of the multi-qubit quantum logic operations and the respective probabilities of each qubit being prepared with an error, and a person skilled in the art will be able to determine these threshold values without undue burden either analytically or numerically based upon these factors.

The plurality of non-measurement multi-qubit quantum logic operations may comprise performing the following gates: a first controlled-NOT (CNOT) gate controlled by the at least one data qubit and acting on a first auxiliary qubit of the plurality of auxiliary qubits; a second CNOT gate controlled by the at least one data qubit and acting on a second auxiliary qubit of the plurality of auxiliary qubits; and then, a Toffoli gate controlled by the first and second auxiliary qubits and acting on the at least one data qubit.

This sequence of gates has the effect of reducing the probability of an error affecting the at least one data qubit.

Alternatively, the plurality of non-measurement multi-qubit quantum logic operations may comprise performing the following gates: a CNOT gate controlled by the at least one data qubit and acting on a first auxiliary qubit of the plurality of auxiliary qubits; then a first Toffoli gate controlled by the at least one data qubit and the first auxiliary qubit and acting on a second auxiliary qubit of the plurality of auxiliary qubits; and then, a second Toffoli gate controlled by the first and second auxiliary qubits and acting on the at least one data qubit.

This sequence of gates has the effect of reducing the probability of an error affecting the at least one data qubit, although the use of two Toffoli gates may result in a higher gate error rate compared to the previous sequence of gates.

The method may further comprise concatenating (i.e. nesting) the plurality of non-measurement multi-qubit quantum logic operations. This concatenation of operations has the effect of further reducing the probability of an error affecting the at least one data qubit.

The respective initial states may be computational $|0\rangle$ states, and the error may be a bitflip error.

In a disclosed embodiment, the auxiliary qubits are not measured. Since disclosed embodiments do not require any qubits to be measured, the methods can generally be performed more quickly than schemes that require measurement (such as postselection schemes) as measurement operations are often relatively slow on quantum computers. is the solution provided by disclosed embodiments are also unaffected by measurement errors.

A method may optionally further comprise providing the at least one data qubit for use in a quantum computation. For example, the data qubit may be used as a syndrome qubit for syndrome extraction in a quantum error correction protocol such as a surface code or other stabilizer code.

According to a second aspect, there is provided a computer-implemented postselection-free method of initializing qubits in a quantum computer, that includes, for example, providing a plurality of auxiliary qubits, each auxiliary qubit associated with a respective node on a graph; providing at least one data qubit, the at least one data qubit associated with an edge on the graph; preparing the at least one data qubit and the plurality of auxiliary qubits in respective initial states, wherein each of the at least one data qubit and the plurality of auxiliary qubits has a respective probability of being prepared with an error; and, for each edge on the graph, performing a plurality of CNOT gates controlled by the data qubit associated with the each edge and targeting the auxiliary qubits associated with each node connected to the each edge, and then performing a Toffoli gate controlled by the auxiliary qubits associated with each node connected to the each edge and targeting the data qubit associated with the each edge.

This example method shares the benefits of the first aspect. In addition, the graph-based nature of the second aspect means that all gates can be performed between neighboring qubits when the layout of the qubits matches the structure of the graph, thereby making the method easier to implement on a physical quantum computer.

The method may further comprise, prior to performing the Toffoli gate controlled by the auxiliary qubits associated with each node connected to the each edge and targeting the data qubit associated with the each edge: for at least one node in the graph, performing a Toffoli gate targeting the auxiliary qubit associated with the at least one node and controlled by the data qubits associated with the edges connected to the at least one.

These additional Toffoli gates mitigate against errors being spread in the event that clusters of errors occur on adjacent data qubits. These additional Toffoli gates are preferably performed for every node having more than one edge (i.e. having degree greater than one).

The graph may be a path or a long cycle. This is particularly advantageous because the qubits can be arranged in a single plane.

According to a third aspect, there is provided a method of performing quantum error correction in a quantum error correction procedure, the method may include, for example: preparing at least one syndrome qubit and a plurality of auxiliary qubits in respective initial states, wherein each of the at least one syndrome qubit and the plurality of auxiliary qubits has a respective probability of being prepared with an error; performing a plurality of non-measurement multi-qubit quantum logic operations that propagate errors between the at least one syndrome qubit and the plurality of auxiliary qubits so as to reduce the probability of an error affecting the at least one syndrome qubit; and, performing syndrome extraction using the at least one syndrome qubit.

Syndrome extraction is generally required on a repeated and regular basis when performing quantum error correction, which means initialization methods based on postselection are unsuitable and require complex probabilistic scheduling algorithms. In contrast, using the method of the third aspect avoids the need for complex scheduling algorithms because no postselection is required.

According to a fourth aspect, there is provided a quantum computing control system comprising a classical processor configured to perform the method of any of the first to third aspects.

According to a fifth aspect, there is provided a computer readable medium comprising instructions which, when executed by a classical processor, cause the processor to perform the method of any of the first to third aspects.

BRIEF DESCRIPTION OF THE DRAWINGS

Examples of the present invention will now be described in detail with reference to the accompanying drawings, in which:

FIG. 18 illustrates the arrangement of qubits in an IBM® Falcon r4 processor;

FIG. 19 illustrates exemplary syndrome operations when performing surface code quantum error correction using the Falcon r4 processor;

DETAILED DESCRIPTION

The present disclosure relates to a postselection-free method of initializing qubits in a quantum computer. Physical implementations of quantum computers now reliably achieve two-qubit gate fidelities above 99.7%. However, state preparation and measurement (SPAM) fidelities are generally significantly lower than this, leaving SPAM errors as the dominant source of error in many machines.

SPAM errors present a significant obstacle to implementing fault-tolerant quantum computation. Preparation and measurement of auxiliary syndrome qubits is ubiquitous in such computations, so error correction performance will be severely limited by SPAM errors. This motivates the use of more complex preparation techniques, using small circuits to obtain $|0\rangle$ states of higher quality than can be produced directly.

Figure 1:
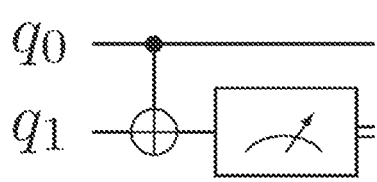
FIG. 1 is a quantum circuit diagram illustrating a known method for initializing qubits using postselection.

A conventional approach to reducing the rate of state preparation errors is the prior art circuit shown in FIG. 1. In this circuit a data qubit ($q_0$) and an auxiliary qubit ($q_1$) are prepared in state $|0\rangle$, and a controlled-NOT (CNOT) gate is then performed on the auxiliary qubit controlled by the data qubit. The auxiliary qubit is then measured in the computational basis ($|0\rangle$, $|1\rangle$). If the measurement outcome is 0 then the data qubit is output as a high-quality $|0\rangle$ state (i.e. having a reduced probability of error compared to simply preparing a single qubit in the $|0\rangle$ state). If not, the data qubit is rejected and the process is repeated.

To demonstrate how this circuit works, first suppose that the gates are performed perfectly but that each qubit preparation incorrectly produces the state $|1\rangle$ with probability $p_0$, and that each measurement outcome is also incorrect with probability $p_0$, with all errors independent. In this scenario, the measurement result is 0 precisely when there are an even number of errors across the two preparations and one measurement. This means that the correct $|0\rangle$ state will be output if there are no errors, or two errors which occur on the second preparation and the measurement. Otherwise, the method will either incorrectly output the state $|1\rangle$ or reject the data qubit.

Conditional on the acceptance (i.e. postselection), the circuit of FIG. 1 produces postselected $|0\rangle$ states with an error rate $2p_0^2+O(p_0^3)$. This postselection is an acceptable method for the production of complex logical states such as T-magic states, where the scheduling difficulties it presents (i.e. repeating until success rather than performing a predetermined set of operations) are an acceptable trade-off for implementing logical non-Clifford gates in a fault-tolerant manner. However, this trade-off is less acceptable when large numbers of simple physical $|0\rangle$ states are required on a regular clock, such as during syndrome extraction in quantum error correction codes.

Figure 2:
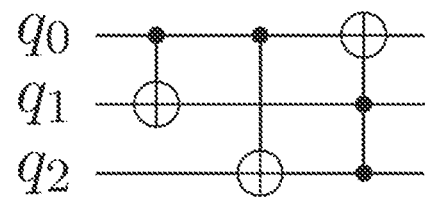
FIG. 2 is a quantum circuit diagram illustrating a postselection-free method for initializing qubits.

FIG. 2 illustrates an alternative postselection-free method for initializing qubits according to the present invention. Here $q_0$ is again a data qubit, and $q_1$ and $q_2$ are auxiliary qubits. Using the same error model as above (perfect gates but error rate $p_0$ for qubit preparation and measurement) this circuit correctly outputs a $|0\rangle$ state for the data qubit for input states $|000\rangle$, $|010\rangle$, $|001\rangle$ and $|100\rangle$, therefore producing a high-quality $|0\rangle$ state with error rate $3p_0^2+O(p_0^3)$. This error rate is slightly increased compared to the circuit of FIG. 1 and the circuit requires an extra qubit. However, this initialization circuit has the benefit of not requiring postselection, making it much better suited to scenarios such as syndrome extraction where postselection requires complex probabilistic scheduling.

The following table summarises the outcomes for each circuit.

| total errors | Result | |
|---|---|---|
| | postselection (FIG. 1) | no postselection (FIG. 2) |
| 0 | $|0\rangle$ | $|0\rangle$ |
| 1 | Reject | $|0\rangle$ |
| 2 | $|0\rangle$ with probability ⅓ $|1\rangle$ with probability ⅔ | $|1\rangle$ |
| 3 | Reject | $|1\rangle$ |

The postselection-free approach of FIG. 2 has a higher yield of $|0\rangle$ states on the data qubit, correctly processing all cases with one error rather than one of the cases with two errors. It also greatly simplifies scheduling of $|0\rangle$ production and avoids delays on architectures where measurement is significantly slower than applying gates. However, it does have higher resource requirements, requiring one additional auxiliary qubit and more gates, including a physical Toffoli gate.

In the present disclosure, these postselection-free circuits for initializing qubits will be referred to as "purification circuits". An (n,k,e) purification circuit is a CNOT and Toffoli circuit that maps n-long bitstrings of weight at most e into the space of n-long bitstrings that are zero in k nominated positions. In other words, an (n,k,e) purification circuit has n qubits, of which k are data qubits, and can reliably correct up to e preparation errors. If each value in the input is intended to be $|0\rangle$ but experiences an independent error probability $p_0$ of being flipped to a $|1\rangle$ (a bitflip error), then each of the k outputs of an (n,k,e) purification circuit experiences a reduced error rate $O(p_0^{e+1})$.

Figure 3A:
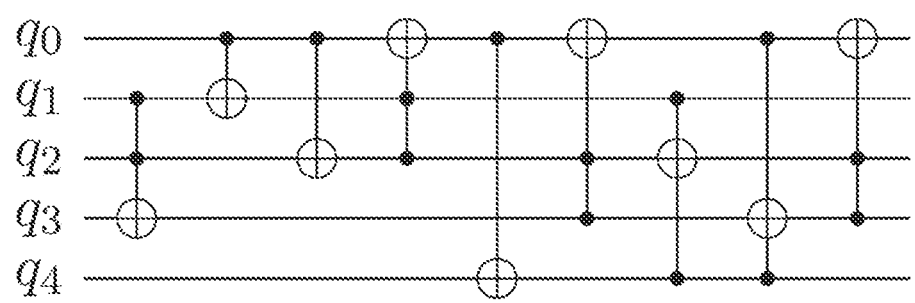
FIGS. 3a and 3b are quantum circuit diagrams illustrating additional postselection-free methods for initializing qubits.
Figure 3B:
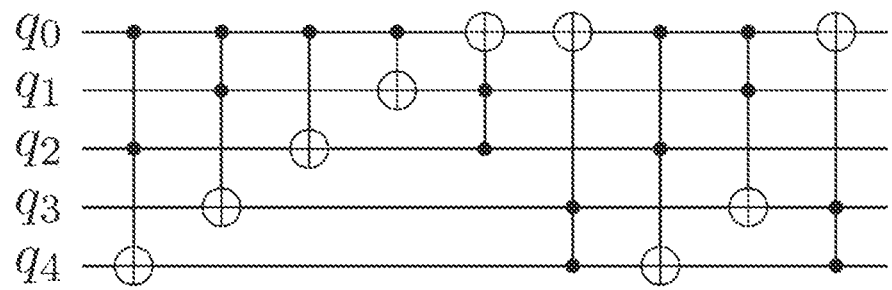

The circuit in FIG. 2 is a (3, 1, 1) circuit. Two examples of (5, 1, 2) circuits are shown in FIGS. 3a and 3b. Logically equivalent circuits can be obtained by permuting the bottom four wires, or by interchanging commuting gates. These circuits use five qubits (one data qubit $q_0$ and four auxiliary qubits $q_1$ to $q_4$) and can reliably correct up to two preparation errors.

Figure 4:
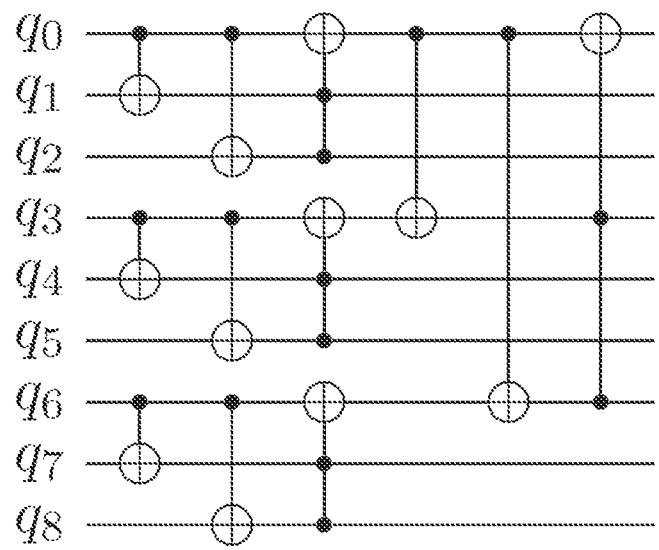
FIG. 4 is a circuit diagram illustrating a concatenated postselection-free method for initializing qubits.

While purification circuits can be found through brute force methods (e.g. by simulating error propagation using a classical computer), additional purification circuits can also be generated by concatenating known purification circuits, such as that shown in FIG. 4, which concatenates the circuit from FIG. 2 to create a (9, 1, 3) circuit in which three (3, 1, 1) circuits feed their output to a fourth (3, 1, 1) circuit.

An error on the output of the data qubit $q_0$ requires errors on at least two of the inputs of the fourth circuit ($q_0$, $q_3$ and $q_6$), which requires at least two errors on at least two of the first three circuits, so the concatenated circuit has parameters (9, 1, 3).

In general, feeding the outputs of $n_2$ copies of an ($n_1$, 1, $e_1$) purification circuit with $g_1$ gates into an ($n_2$, 1, $e_2$) purification circuit with $g_2$ gates produces an ($n_1$ $n_2$, 1, $(e_1+1)(e_2+1) -1$) circuit with $n_2 g_1 + g_2$ gates.

Different types of circuit can be used for (and even within) each layer of the concatenation. Feeding e.g. three (5, 1, 2) circuits into a (3, 1, 1) circuit or feeding five (3, 1, 1) circuits into a (5, 1, 2) circuit both result in (15, 1, 5) circuits, but the "five-into-three" concatenation uses 30 gates and "three-into-five" uses 20 gates, so there is typically an incentive to use simpler circuits closer to the raw input (i.e. at deeper levels of the concatenation).

Figure 5A:
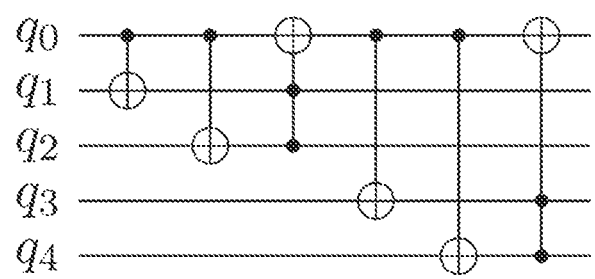
FIGS. 5a and 5b are quantum circuit diagram illustrating further postselection-free methods for initializing qubits.
Figure 5B:
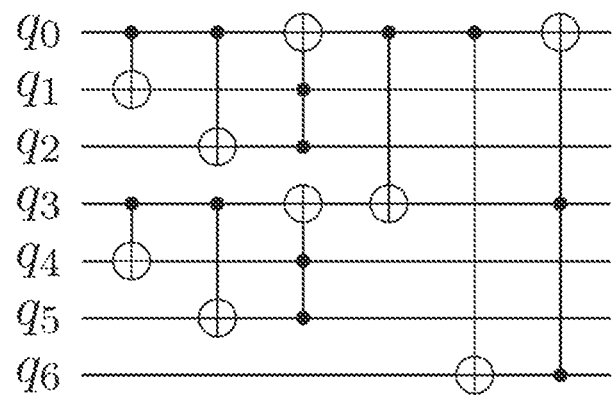

There is no requirement that the circuits in the first stage are identical. For example, some of the first round (3, 1, 1) circuits in the (9, 1, 3) circuit can be replaced by naive preparations. Changing only some of the inputs in this way, as shown in FIGS. 5a and 5b, allows interpolation between the performance and resource requirements of the (3, 1, 1) circuit and the (9, 1, 3) circuit.

Figure 6:
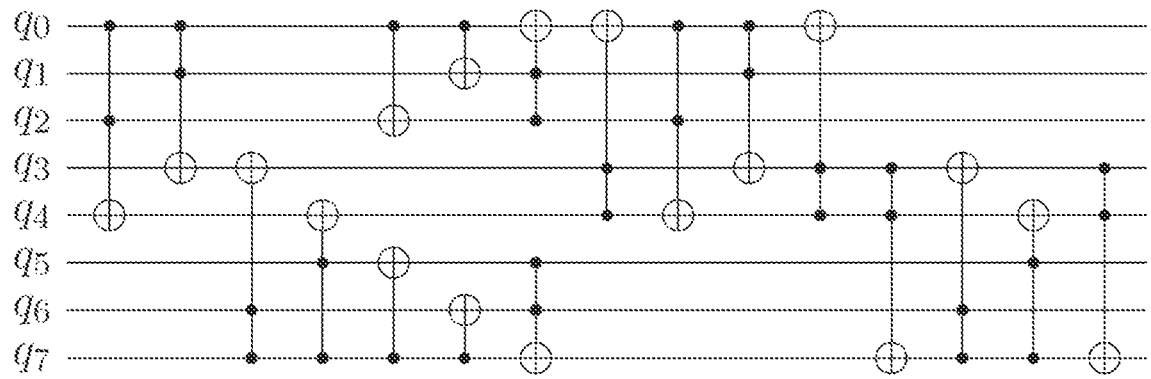
FIG. 6 is a quantum circuit diagram illustrating another postselection-free method for initializing qubits.

In addition to concatenating circuits, it is also possible to juxtapose or overlap known purification circuits to generate larger circuits. Juxtaposing or overlapping circuits allows the auxiliary qubits to be shared when initializing multiple data qubits, and it is therefore generally more resource efficient than performing independent purification circuits in parallel. An example of such a circuit is shown in FIG. 6, which overlaps two (5, 1, 2) circuits to create an (8, 2, 2) circuit in which the auxiliary qubits $q_1$ to $q_6$ are shared between the two data qubits $q_0$ and $q_7$.

Figure 7:
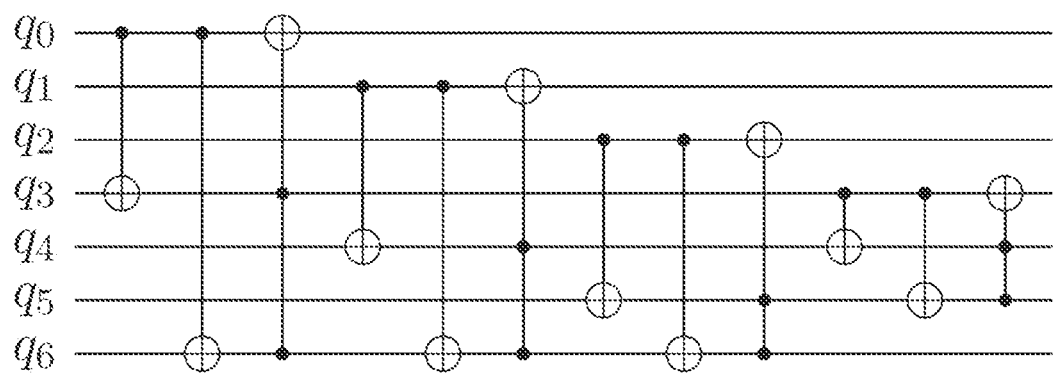
FIG. 7 is a quantum circuit diagram illustrating yet another postselection-free method for initializing qubits.

A (2e+1,1,e) purification circuit can be viewed as a decoder for a (2e+1)-bit classical repetition code. The data qubit represents the majority vote of the input qubits, and the other qubits contain the syndrome information required to reconstruct the input. Any CNOT and Toffoli circuit for decoding a classical [n, k, 2e+1] code can be viewed as an (n,k,e) purification circuit in the same way. This is generally more than is necessary: purification circuits only require that strings close to the zero codeword are correctly decoded, and it is also possible to create purification circuits that do not represent decoders for classical codes. For example, the purification circuit shown in FIG. 7 is a (7, 4, 1) purification circuit based on a classical Hamming code.

With perfect gates, an (n,k,e) purification circuit improves a preparation error rate $p_0$ to $O(p_0^{e+1})$. In practice, purification circuits will themselves be subject to error, meaning that the dominant term in the output error probability is likely to be due to gate failures, for example of the final Toffoli, meaning that there may be limited advantage to increasing e depending on the ratio between preparation error rates and gate error rates.

Additional purification circuits can be obtained based on graph constructions. The operation of the (3, 1, 1) purification circuit shown in FIG. 2 can be interpreted as follows. When the single allowed error is on the data qubit, the two CNOT gates effectively "mark" the auxiliary qubits (i.e. the CNOT gates propagate the error from the data qubit to the auxiliary qubits). This double mark is detected by the Toffoli gate, which clears the error on the data qubit (i.e. a bitflip is effectively propagated back to the data qubit, thereby reversing the original error). When the error is on an auxiliary qubit, it does not propagate through the CNOT gates, and it is not able to activate both controls of the Toffoli gate, so the data qubit remains unchanged.

If instead there is some number a of auxiliary qubits, then there are $$\binom{a}{2}$$

pairs available for marking in this way, which can be used to protect up to $$\binom{a}{2}$$

data qubits against a single preparation error. This construction can be described in the language of graphs (although it should be understood that not all purification circuits can be described using a graph representation).

Given a graph G with n vertices and m edges, an (n+m, m,1) purification circuit can be obtained as follows. One data qubit $q_{uv}$ is associated with each edge uv, and one auxiliary qubit is associated with each vertex (or node) v. For each edge uv, two CNOT gates are applied controlled by $q_{uv}$ and targeting $q_u$ and $q_v$ respectively; this is referred to as the "detection" phase because errors on $q_{uv}$ are propagated to (i.e. detected by) $q_u$ and $q_v$. Next, for each edge uv, a Toffoli gate is applied controlled by $q_u$ and $q_v$ and targeting $q_{uv}$; this is referred to as the "correction" phase because any error propagated in the detection phase will now be propagated to the data qubit, thereby reversing (i.e. correcting) the original error.

The gates within each phase commute so can be performed in any order. The circuit has 2m CNOT gates and m Toffolis and can be scheduled over at most $3\chi_e$ (G) rounds, where $\chi_e$ (G) is the edge-chromatic number of G.

Figure 8:
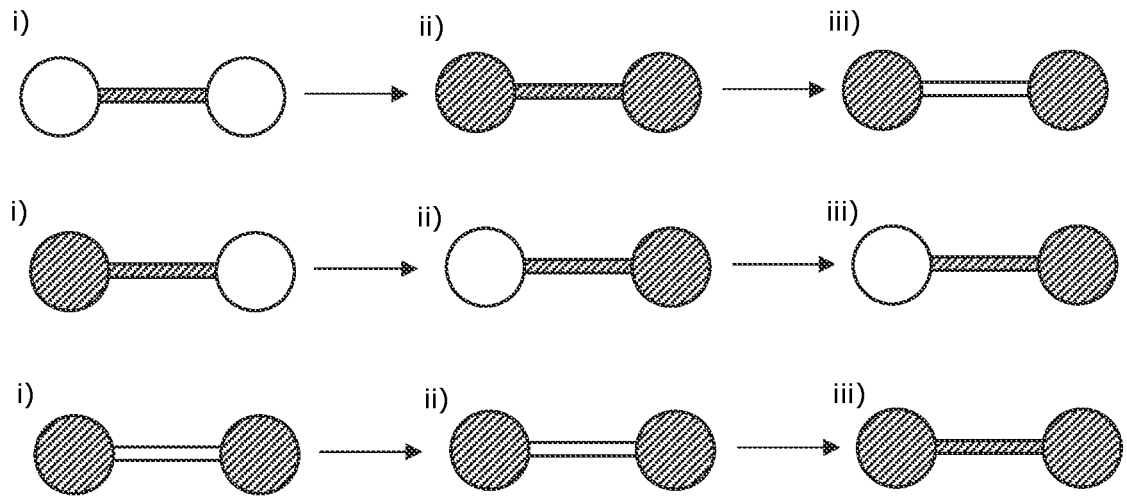
FIG. 8 is a graph-based representation showing the propagation of errors when initializing qubits using the quantum circuit of FIG. 2.

The effect of these gates is analogous to a weak surface code. In the first round the CNOT gates take the boundary of the set of edges experiencing an error. In the second round the Toffoli gates "correct" the state of any edge both of whose endpoints appear in the boundary. FIG. 8 illustrates this graph construction for the (3, 1, 1) circuit of FIG. 2.

In FIG. 8, the auxiliary qubits $q_1$ and $q_2$ are represented by the nodes/vertices, and the edge/line linking them represents the data qubit $q_0$. The first stage (labelled 'i') represents the initial state of the qubits (with shading indicating the occurrence of an error on that qubit), the second stage (labelled 'ii') represents the state of the qubits after the CNOT gates (i.e. after the detection stage), and the third stage (labelled 'iii') represents the state of the qubits after the Toffoli gate (i.e. after the correction stage).

The top error progression in FIG. 8 illustrates correct operation of the circuit when there is a single error on the data qubit, and the bottom two progressions represent ways in which the (3, 1, 1) purification circuit can fail when there are two preparation errors spread across the qubits.

Figure 9:
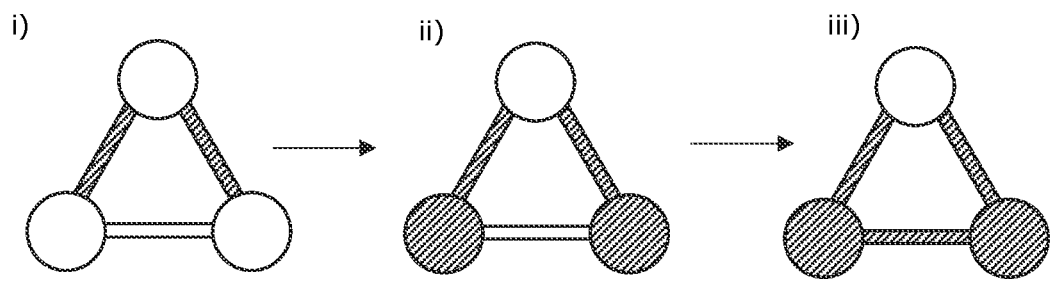
FIG. 9 is a graph-based representation showing the propagation of errors when initializing qubits using an alternative postselection-free quantum circuit.
Figure 10:
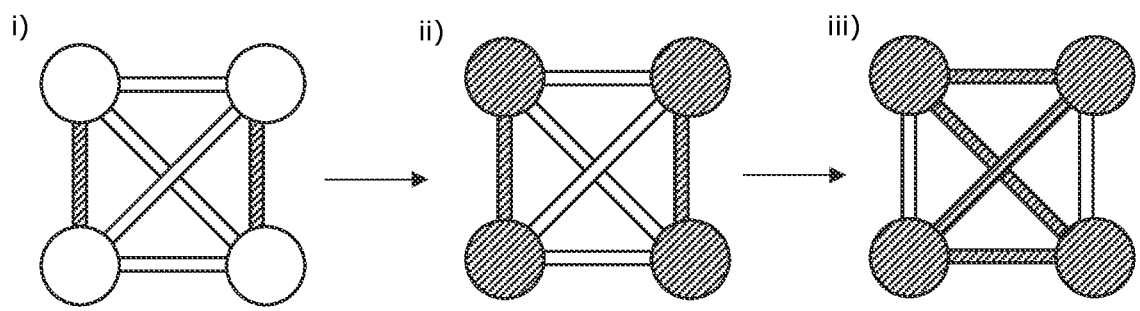
FIG. 10 is a graph-based representation showing the propagation of errors when initializing qubits using another alternative postselection-free quantum circuit.

In larger graphs there are additional modes of failure. Errors on two incident edges cancel out part of their boundary, leading to neither error being cleared and inducing an error on any edge spanning their other two endpoints (as illustrated in FIG. 9, which uses the same notation as FIG. 8). Errors on two disjoint edges are successfully cleared by the circuits but cause errors on other edges induced by these vertices (as illustrated in FIG. 10, which again uses the same notation as FIG. 8).

Figure 11:
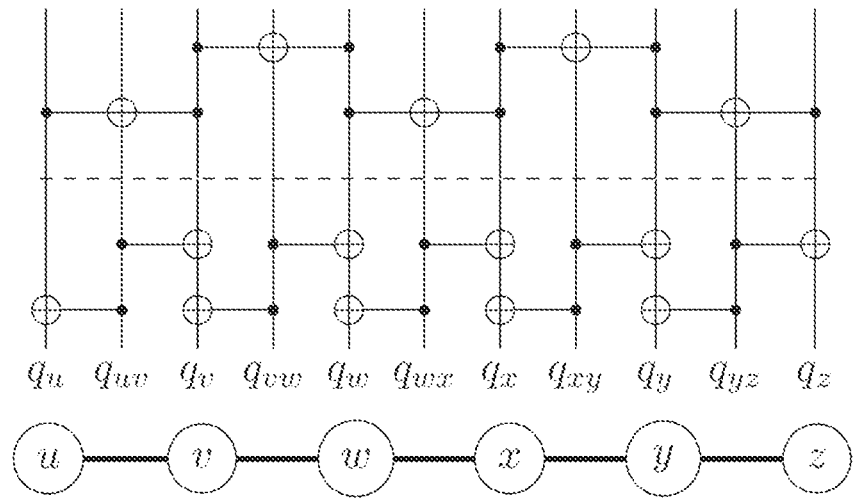
FIG. 11 illustrates a postselection-free method for initializing qubits based on a graph cycle or path.

Taking G to be a complete graph $K_n$ produces an $$\left(n + \binom{n}{2}, \binom{n}{2}, 1\right)$$

purification circuit, meaning that a set of $$k = \binom{n}{2}$$

qubits can be protected against a single preparation error with only $O(\sqrt{k})$ overhead. However, in addition to failing for some sets of two-qubit preparation errors (such as in FIGS. 9 and 10), the circuits for complete graphs have the disadvantage that they require $\Omega(n)$ rounds of gates (where $\Omega$ represents the asymptotic lower bound). These disadvantages can be addressed by choosing a sparser graph, such a long cycle or path as shown in FIG. 11 (here the detection phase is below the dashed line, and the correction phase is above the dashed line). If G is a cycle c n on n vertices, then the circuit can be scheduled over four (if n is even) or five (if n is odd) rounds and has a natural planar layout. In addition, an (n,k,e) purification circuit defined using a long cycle or path will generally outperform its parameters and protect against more than e errors in most scenarios (i.e. e, which is always 1 for paths and cycles, is the guaranteed minimum number of errors that can be corrected assuming perfect gates rather than an upper limit).

A (2n, n, 1) circuit defined over a cycle protects completely against any single error. Two or more errors on the input might lead to an error on the output, but only if those errors are sufficiently close. Each output qubit of a circuit defined over a cycle or path effectively has a "light cone", which is the subset of the gates and input qubits that can causally affect it; the state of the output qubit depends only on the preparation and gate errors on this part of the circuit. Over a long even cycle there are only two types of output data qubit up to isomorphism, and so two possible light cones, shown in FIGS. 12a and 12b.

With preparation error rate $p_0$ and perfect gates, each output data qubit experiences errors with probability $O(p_0^2)$. Output errors on qubits are independent if they are sufficiently separated that their light cones are disjoint, but errors on nearby output qubits are correlated. Suppose that some set of a errors on the input leads to b>a errors on the output data qubits. Then an event which should have probability $O(p_0^b)$ in fact occurs with probability $\Omega(p_0^a)$ (i.e. the error rate is increased).

A purification circuit will be referred to as combinatorially fault-tolerant up to s errors if, for any r≤s, any set of r errors on the input leads to at most r errors on the output data qubits. For example, purification circuits corresponding to long cycles are combinatorially fault-tolerant up to three errors, and there is exactly one pattern of four errors on the input leading to more than four errors on the output data qubits (illustrated in FIG. 13, in which stages i, ii and iii refer to the initial, post-detection and post-correction error states of the qubits).

Figure 13:
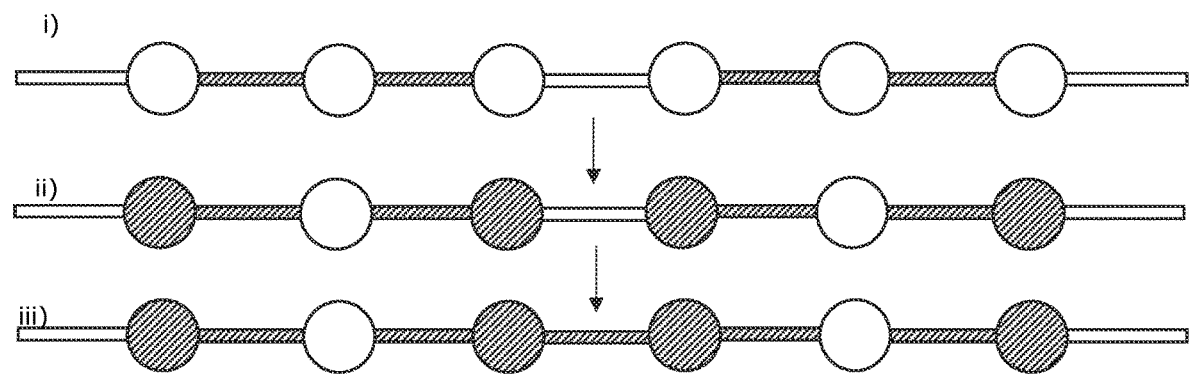
FIG. 13 is a graph-based representation showing an example propagation of errors when using the postselection-free method of FIG. 11 to initialize qubits.
Figure 14:
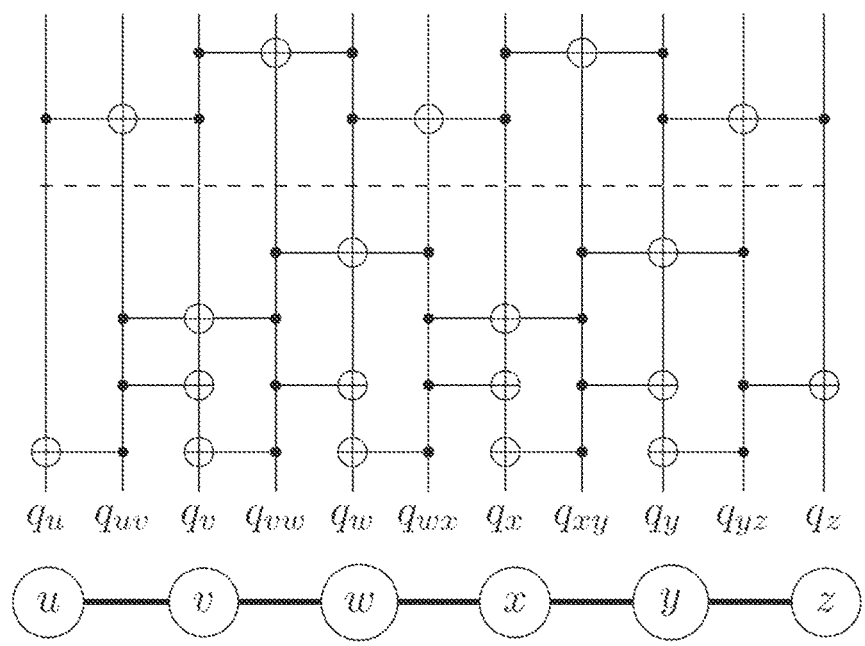
FIG. 14 is another postselection-free method for initializing qubits based on a graph cycle or path.

In FIG. 13, input errors on two adjacent edges are effectively frozen in place as their shared auxiliary qubit is first set to |1⟩ then reset to |0⟩ so does not activate the Toffoli gates. Two of these frozen patterns placed one edge apart preserve the original errors but also cause a new error on the separating edge. One way to stop this behavior is to prevent errors on adjacent pairs of edges from being frozen in place. This can be achieved by adding an extra round of Toffoli gates to the detection phase as illustrated in FIG. 14. As before, the first part of the detection phase involves applying two CNOT gates for each edge uv controlled by $q_{uv}$ and targeting $q_u$ and $q_v$ respectively. Then a second part of the detection phase is performed in which for each pair of consecutive edges uv, uw, a Toffoli gate is performed controlled by $q_{uv}$ and $q_{vw}$ and targeting $q_v$. The correction phase (above the dashed line) then proceeds as before, with a Toffoli gate controlled by $q_u$ and $q_v$ and targeting $q_{uv}$ being performed for each edge uv. This purification circuit is combinatorially fault-tolerant for any number of preparation errors.

Figure 15A:
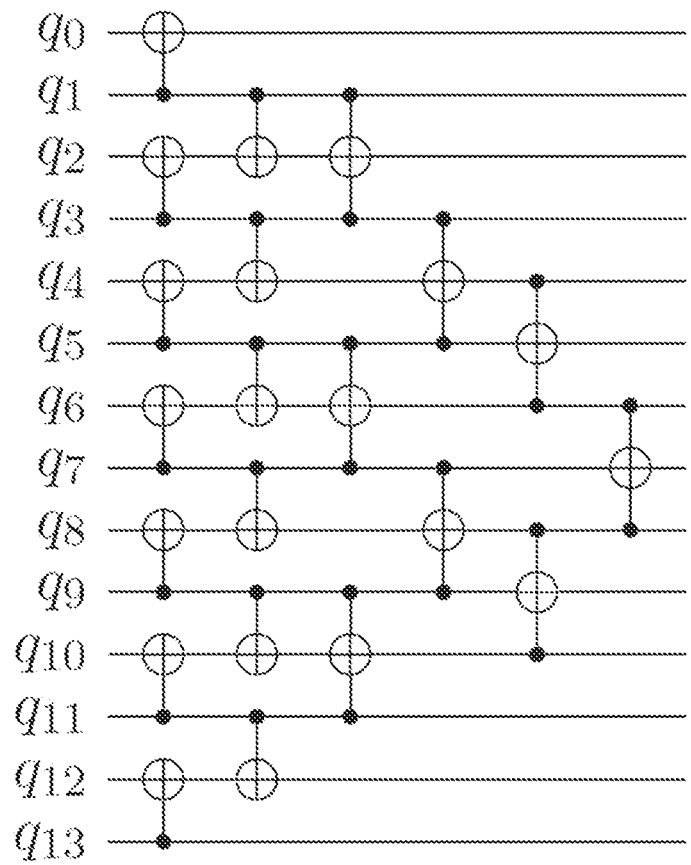
FIGS. 15a and 15b illustrate large and small light cones respectively when using the postselection-free method of FIG. 14 to initialize qubits.
Figure 15B:
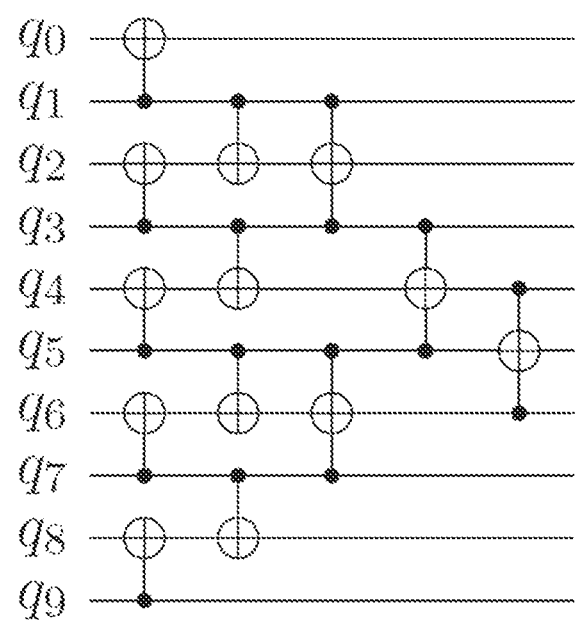

The gates from both detection phases commute with each other, so these can be performed in any order (such as the order shown in FIG. 14). The light cones of a long cycle using this two-part detection phase with additional Toffoli gates are shown in FIGS. 15a and 15b.

If there are no input errors on the vertices then the detection stage marks all of the endpoints of each edge with an input error, with no cancellation arising from errors on consecutive edges. Then an input error on an edge is successfully cleared unless there is also an input error on one of its endpoints, and an edge with no input error experiences an error on the output only if, for both of its endpoints, there is an input error on either that vertex or the next edge.

Every purification circuit has an output error probability $p_{out}$, which will generally be a function of the preparation error rate $p_0$ and the gate error rate $p_{gate}$. $p_{out}$ represents the probability of an error affecting each output data qubit. These error probabilities can either be determined numerically (e.g. using Monte Carlo methods) or analytically (e.g. by determining terms of the polynomial function to the desired accuracy).

With perfect gates ($p_{gate}=0$), the output error probability $p_{out}$ of a purification circuit is a polynomial function of the preparation error rate N. The table below gives the leading order term for each of the purification circuits described above.

Output error probabilities can also be determined when using imperfect gates.

For a given preparation error rate $p_0$ and purification circuit, there exists a threshold value $p_{th}$ of the gate error rate $p_{gate}$ below which it is beneficial to use the purification circuit (i.e. using the purification circuit will result in a value of $p_{out}$ which is less than $p_0$). This threshold value $p_{th}$ can be determined by identifying the least positive value of $p_{gate}$ where the output error probability $p_{out}$ of the purification circuit is equal to $p_0$ (e.g. by plotting $p_{out}$ against $p_{gate}$ for a given purification circuit and preparation error rate $p_0$ and determining the least positive value where the this meets the line $p_{out}=p_0$).

When $p_{gate}$ is less than $p_{th}$, using a purification circuit will lead to a decrease in the overall error rate (i.e. $p_{out}$ will be less than $p_0$). However, values of $p_{gate}$ above this threshold value may lead to an increase in the effective preparation error rate.

Figure 12A:
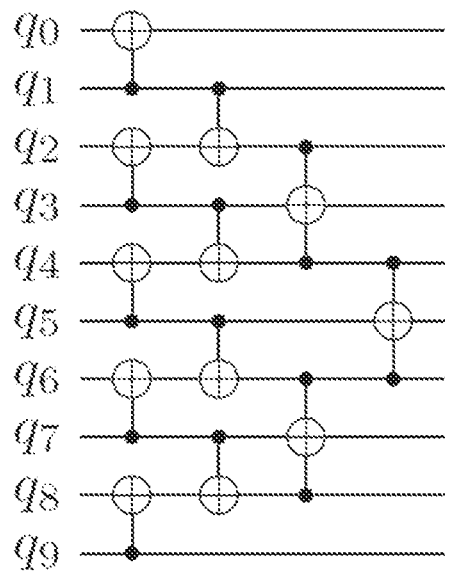
FIGS. 12a and 12b illustrate large and small light cones respectively when using the postselection-free method of FIG. 11 to initialize qubits.
Figure 12B:
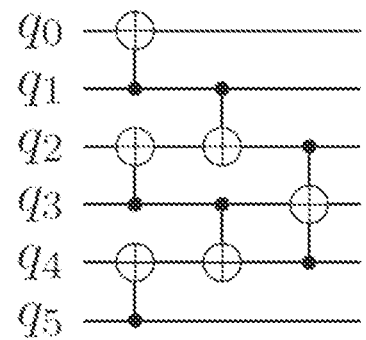

| purification circuit | first order error probability |
| --- | --- |
| bare (no purification circuit) | $p_0^2$ |
| (3, 1, 1) - FIG. 2 | $3p_0^2$ |
| (5, 1, 1) - FIG. 5a | $p_0^2$ |
| (7, 1, 2) - FIG. 5b | $6p_0^3$ |
| (9, 1, 3) - FIG. 4 | $27p_0^4$ |
| (5, 1, 2) - FIGS. 3a and 3b | $10p_0^3$ |
| (8, 2, 2) - FIG. 6 | $29p_0^3/2$ |
| (7, 4, 1) - FIG. 7 | $27p_0^2/4$ |
| Cycle (large/small light cone) - FIGS. 12a and 12b | $8p_0^2$ |
| Fault-tolerant cycle (large/small light cone) - FIGS. 15a and 15b | $6p_0^2$ |

Figure 16:
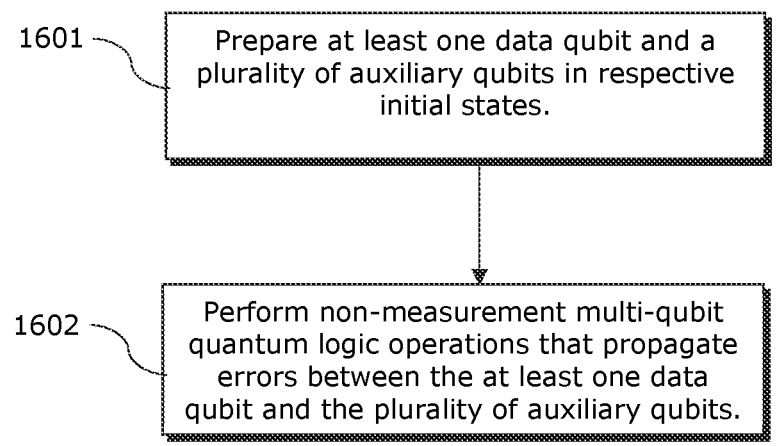
FIG. 16 is a flow chart illustrating a computer-implemented postselection-free method of initializing qubits in a quantum computer.

FIG. 16 illustrates a method for initializing qubits in a quantum computer according to the present invention. In step 1601, at least one data qubit and a plurality of auxiliary qubits are prepared in respective initial states with some error probability (i.e. having some probability $p_0$ of being prepared in e.g. a |1⟩ state instead of a |0⟩ state). The error probability may be the same for each qubit, or it may alternatively be different for each qubit.

In step 1602, non-measurement multi-qubit quantum logic operations are performed that propagate errors between the at least one data qubit and the plurality of auxiliary qubits (e.g. one of the purification circuits described above).

Figure 17:
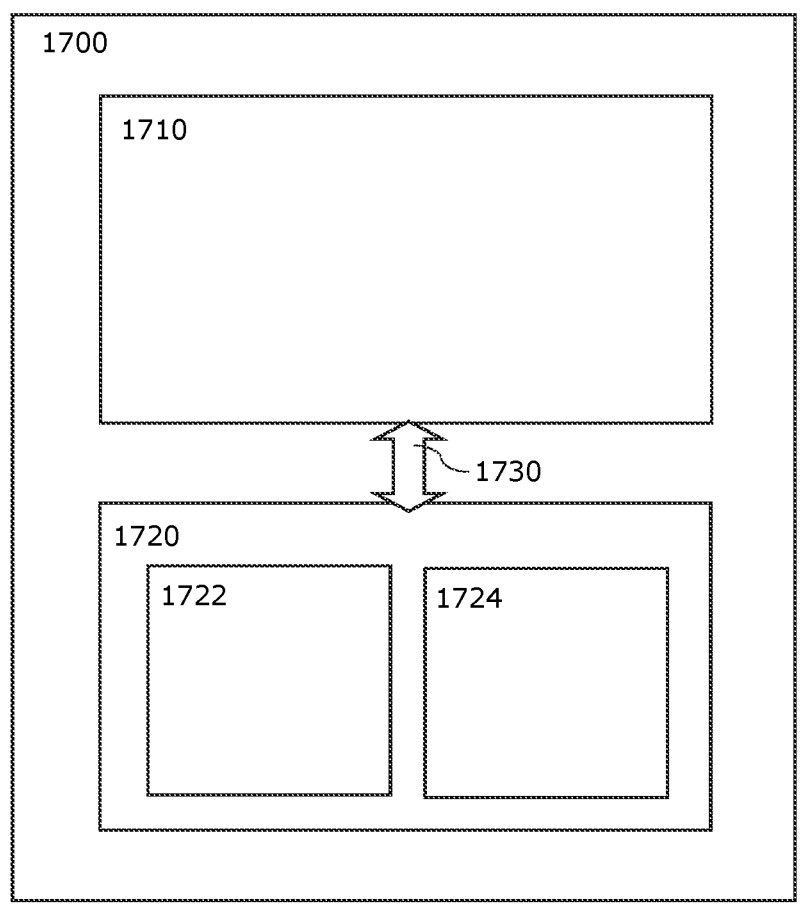
FIG. 17 illustrates a quantum computing system in schematic form.

This method may be performed by a classical processor, e.g. by a control system of a quantum computing system. FIG. 17 illustrates an example of such a quantum computing system 1700. The quantum computing system 1700 features a quantum processing unit (QPU) 1710 having a plurality of qubits. The qubits may be of any type, e.g. superconducting qubits, photonic qubits, quantum dots etc. The QPU 1710 is connected to a control system 1720 by a bus 1730, which may be any interface that allows signals (such as control signals) to be transmitted between the QPU and the control system 1720. The control system 1720 features a processor 1722 and a memory 1724. The processor 1722 is preferably a classical process. However, one skilled in the art will appreciate that a quantum processor can perform any computation that a classical computer can perform, such that the processor 1722 could alternatively be a quantum processor.

Example of Using Purification Circuits with an IBM® Falcon r4 Processor

Path-based purification circuits can be used to initialize qubits when performing surface code syndrome extraction using the IBM® Falcon r4 quantum processor. The arrangement of qubits in the Falcon r4 processor is shown in FIG. 18, in which the symbol D represents a data qubit of the surface code (not to be confused with data qubits of purification circuits), S represents a syndrome qubit (which, as will be explained below, acts as a data qubit of the purification circuit), and x represents an auxiliary qubit.

As is known to one skilled in the art, surface codes are quantum error correction codes defined on graphs/lattices that involve measuring commuting X and Z stabilisers to obtain an error syndrome. A full description of surface codes can be found, for example, in Phys. Rev. A 86, 032324 (2012) by Fowler et al.

Figures 18, 19:
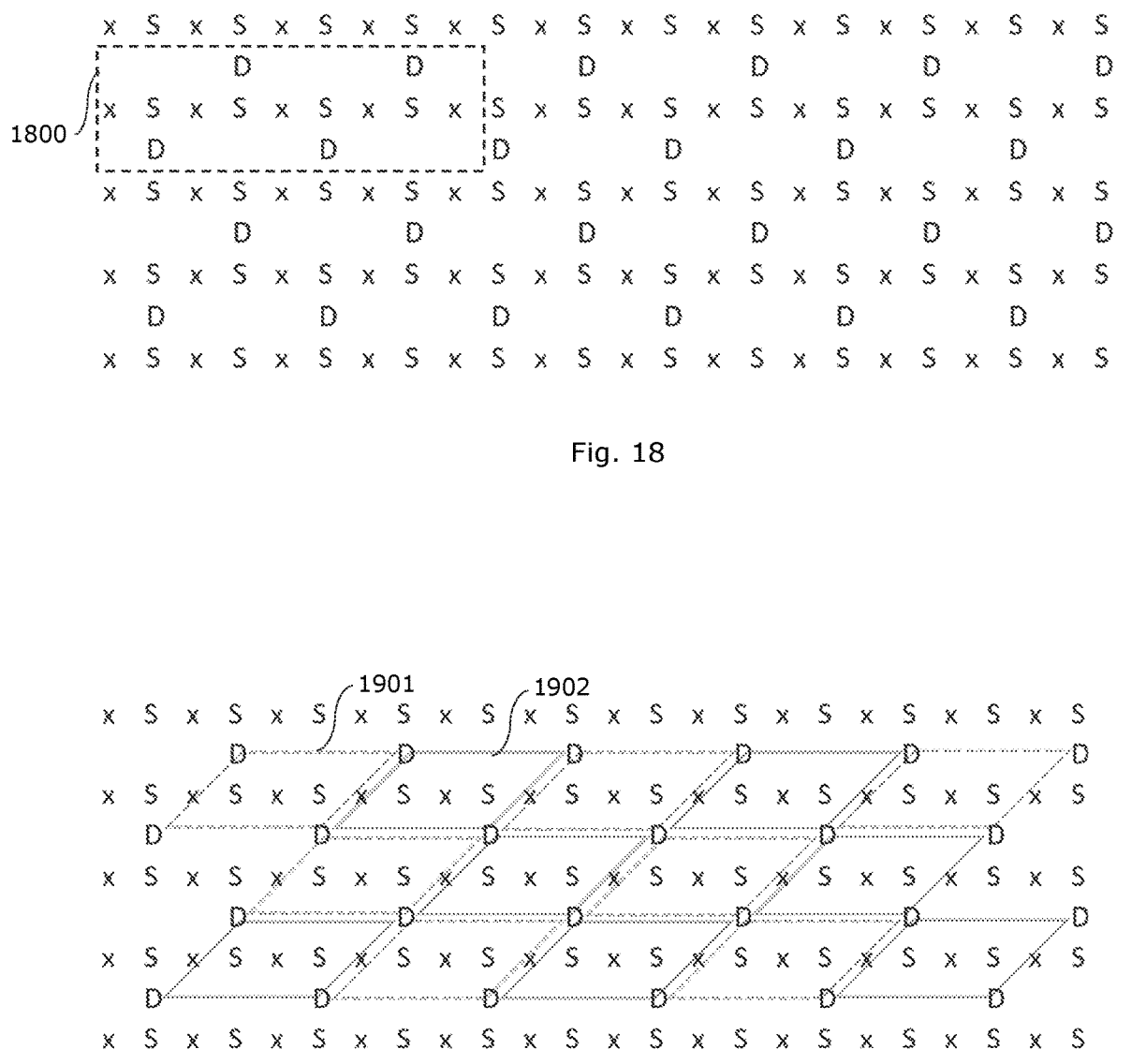

The stabilisers of the surface code are represented by solid-line and dashed-line parallelograms in FIG. 19, in which dashed-line parallelograms 1901 represent X stabilisers on the data qubits positioned at each corner, and solid-line parallelograms 1902 represent Z stabilisers on the data qubits positioned at each corner.

To perform syndrome extraction, each row of syndrome and auxiliary qubits is first purified using a path-based purification circuit, and a small "tree" of S, x and D qubits is then used to perform each syndrome extraction. This process is illustrated in FIGS. 20a-20e and 21-22.

Figure 20A:
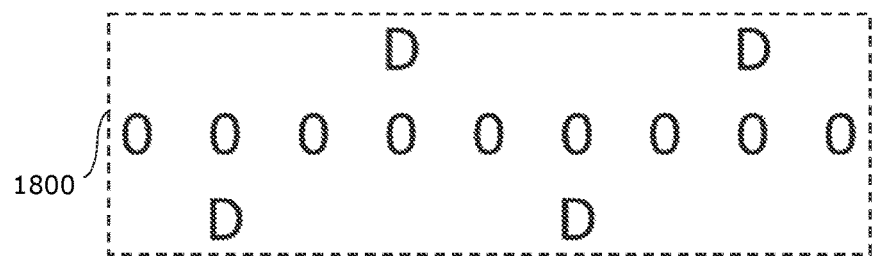
FIGS. 20a-20e illustrate postselection-free quantum operations that can be used to initialize qubits when performing surface code syndrome extraction using the Falcon r4 processor.
Figure 20B:
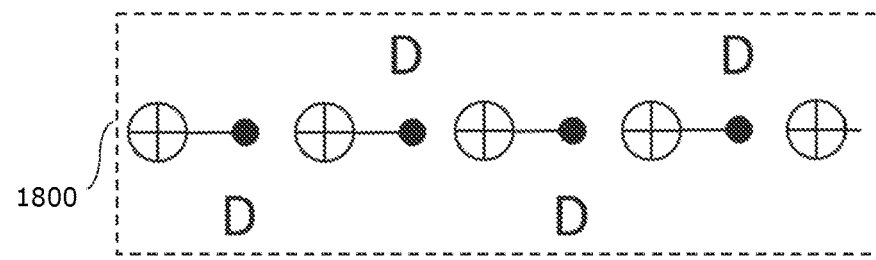
Figure 20C:
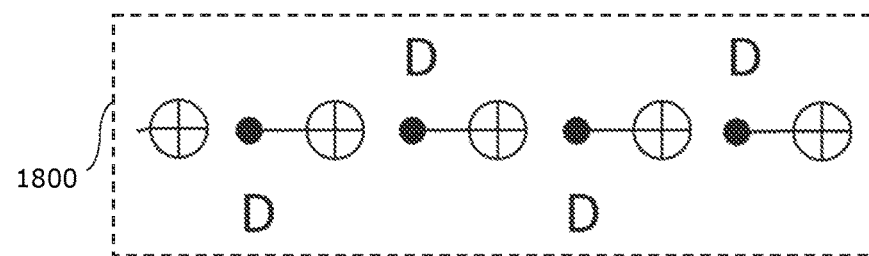
Figure 20D:
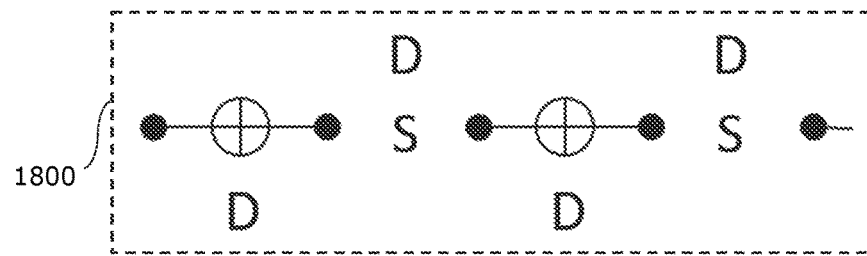
Figure 20E:
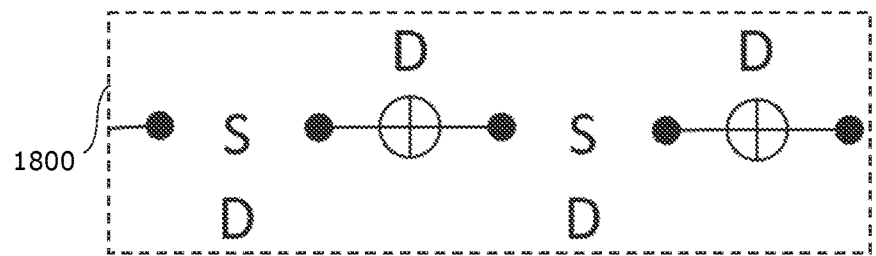

As shown in FIG. 20a, which is a close-up of the qubits in box 1800 in FIG. 18, the syndrome and auxiliary qubits are initially prepared (with error) in |0⟩ states. Next, the "detection" stage is performed, with CNOT gates being applied to the auxiliary qubits controlled by the syndrome qubits (which act as data qubits of the purification circuit) as shown in FIGS. 20b and 20c. The "correction" stage is then performed in two phases as shown in FIGS. 20d and 20e, with Toffoli gates being performed on the syndrome qubits controlled by the neighboring auxiliary qubits. The syndrome qubits are then initialized in |0⟩ with reduced error probability due to the purification circuit. The detection phase could optionally be supplemented with additional Toffoli gates as described above.

Figure 21:
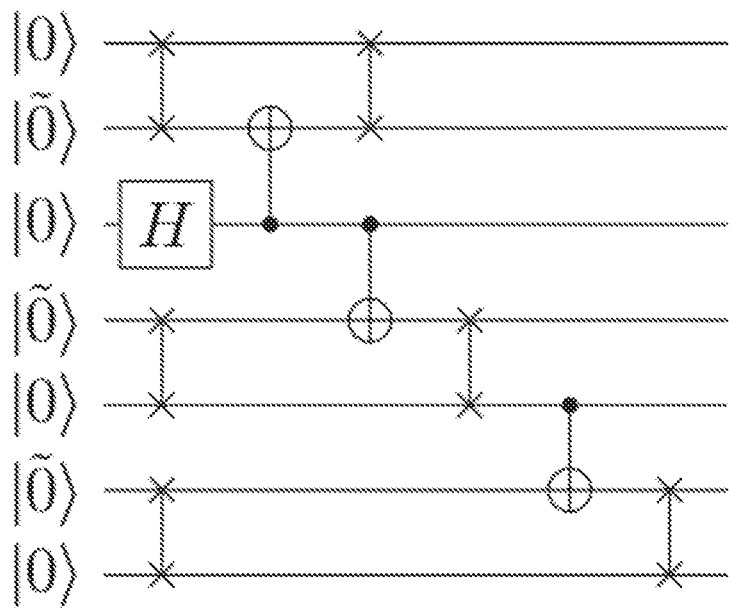
FIG. 21 is a quantum circuit diagram for preparing a GHZ state when performing surface code syndrome extraction using the Falcon r4 processor.

Next, the syndrome qubits are prepared in a GHZ state, for example using the circuit shown in FIG. 21 (in which the qubits with the tilde correspond to auxiliary qubits, and the qubits without the tilde correspond to the syndrome qubits). Finally, the syndrome is measured by performing CNOT gates on the syndrome qubits controlled by the data qubits of the surface code, and the syndrome qubits are then measured in the X basis (|+⟩, |-⟩). The product (parity) of the measurement results gives the syndrome measurement. This syndrome extraction method is known in the art as Shor-style syndrome extraction, and further details are available in "*Fault-tolerant quantum computation*" (1996) arXiv: quant-ph/9605011 by Shor.

Figure 22:
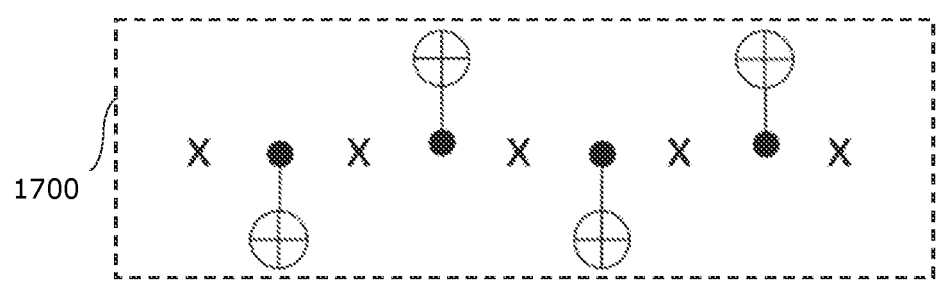
FIG. 22 is a quantum circuit diagram for performing surface code syndrome extraction using the Falcon r4 processor.

While the above steps demonstrate the method for measuring an X stabiliser, corresponding steps can be used to measure a Z stabiliser by reversing the direction of the CNOT gates in FIG. 22, preparing a |++++⟩ + |−−−−⟩ state instead of a |0000⟩ + |1111⟩ GHZ state, and measuring the syndrome qubits in the computational basis.

Example of Using Purification Circuits with a Rigetti® Processor

Figure 23:
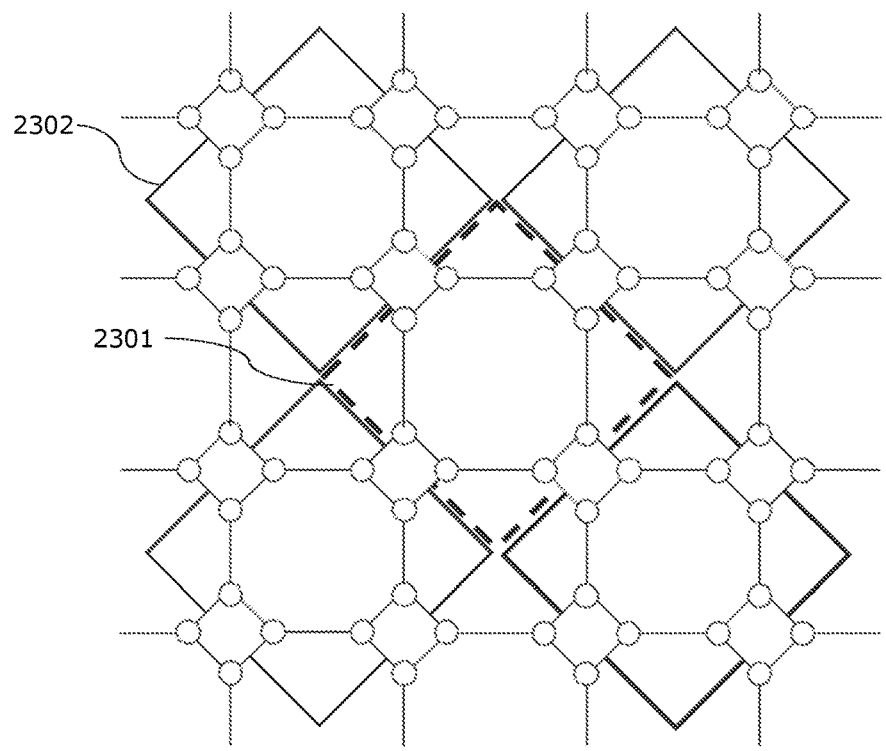
FIG. 23 illustrates the arrangement of qubits in a Rigetti® processor.

The (3, 1, 1) purification circuit of FIG. 2 can be used to initialize qubits when performing surface code syndrome extraction using the Rigetti® quantum processor. The arrangement of qubits in the Rigetti® processor is shown in FIG. 23, in which the circles represent qubits. In FIG. 23, the dashed-line and solid-line diamonds 2301 and 2302 represent Z stabilisers of the surface code (X stabilisers are not illustrated but can be represented similarly on a shifted dual lattice).

Figure 24:
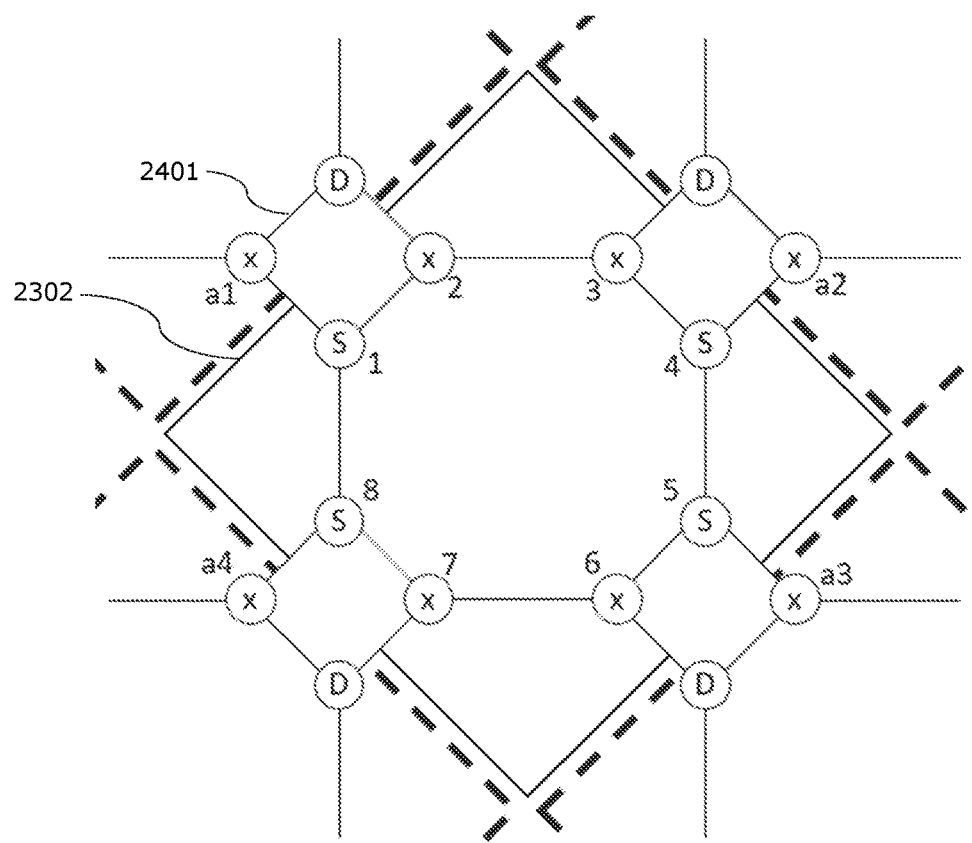
FIG. 24 illustrates the qubit arrangement used when performing surface code syndrome extraction using the Rigetti® processor.

As shown in FIG. 24, each diamond 2301, 2302 has four sub-diamonds 2401, each having four qubits. As before, the symbol D represents a data qubit of the surface code (not to be confused with data qubits of purification circuits), S represents a syndrome qubit (which, as before, acts as a data qubit of the purification circuit) and x represents an auxiliary qubit.

Figure 25:
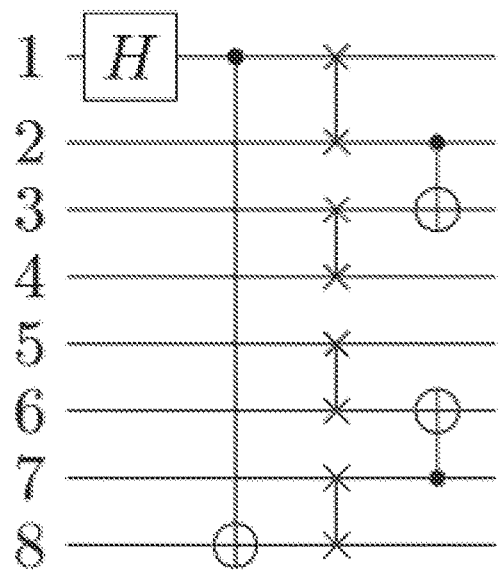
FIG. 25 is a quantum circuit diagram for preparing a GHZ state when performing surface code syndrome extraction using the Rigetti® processor.

When performing syndrome extraction, the (3, 1, 1) purification circuit is performed on the auxiliary and syndrome qubits in each sub-diamond (with the syndrome qubits acting as the data qubits of the purification circuit) to initialize the syndrome qubits. A GHZ state is then formed between the syndrome qubits labelled 2, 3, 6 and 7 in FIG. 24, e.g. using the circuit shown in FIG. 25 (the qubit labels in FIG. 25 correspond to the numbers used to label the qubits in FIG. 24). The circuit in FIG. 25 also acts to swap the syndrome and auxiliary qubits 1 and 2, 3 and 4, 5 and 6 and 7 and 8 respectively such that qubits 2, 3, 6 and 7 become the syndrome qubits.

Figure 26:
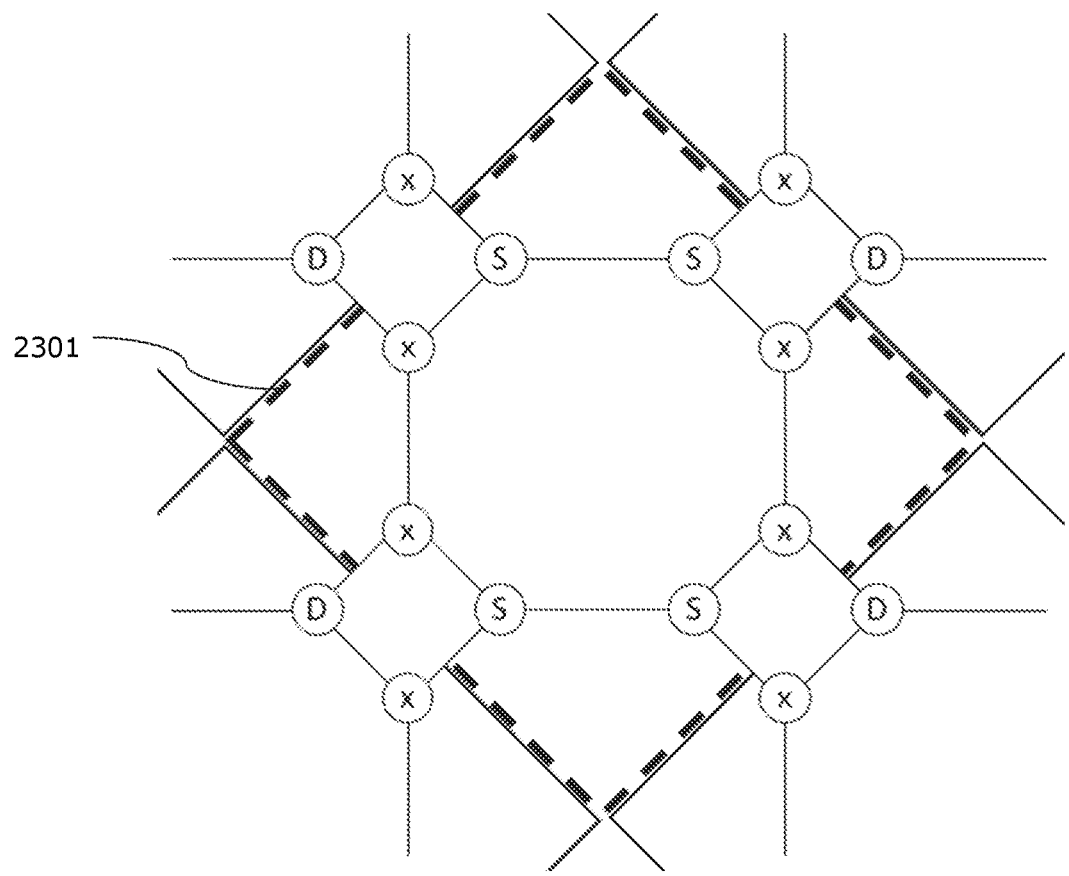
FIG. 26 illustrates the qubit arrangement used when performing another surface code syndrome extraction using the Rigetti® processor.

Shor-style syndrome extraction can then be used to measure the syndrome by performing CNOT gates between the data qubits and qubits 2, 3, 6 and 7 and then measuring qubits 2, 3, 6 and 7. When performing syndrome extraction for a solid-line diamond 2301, the data qubits are first moved using SWAP gates, and the syndrome and auxiliary qubits are then relabelled as shown in FIG. 26.

While the above examples have been given for the surface code, the purification circuits disclosed herein can also be used with other error correction codes, for example other stabiliser codes. While the purification circuits are particularly well-suited to use in syndrome extraction (where repeated qubit initializations are required on a regular cycle), they can be used to initialize qubits for any purpose. Furthermore, while the present invention has focused on preparing |0⟩ states, alternative states could also be prepared (e.g. |1⟩ states could be prepared by performing Pauli-X gates on the output data qubits, and Hadamard gates could be used to prepare qubits in the X-basis).

Furthermore, one skilled in the art will understand that the purification circuits described herein are only some examples of possible purification circuits, and additional circuit exist and can be obtained through various means (e.g. brute force searching, concatenating, juxtaposing etc.) as described above. One skilled in the art will also understand that logically equivalent circuits (e.g. circuits that perform the same permutation of the computational basis) can be used in place of the illustrated circuits, e.g. by permuting qubits, swapping commuting gates etc. As an example, a CNOT gate could be performed using a controlled-PHASE gate in combination with Hadamard gates, and a Toffoli gate could be replaced by a controlled-PHASE gate in combination with controlled-Hadamard gates (which effectively applies a Toffoli gate up to a phase when applied to a mixture of computation basis states).

Various quantum circuit diagrams are illustrated in the figures, and these use conventional symbols that will be known to a person skilled in the art.

The invention claimed is:

1. A quantum error correction method performed at a quantum computing system comprising a control system and a quantum processing unit having a plurality of qubits, the method comprising:
   preparing, by the control system, at least one syndrome qubit and a plurality of auxiliary qubits of the plurality of qubits in respective initial states, wherein each of the at least one syndrome qubit and the plurality of auxiliary qubits has a respective probability greater than zero and less than one half of being prepared with an error;
   performing, by the control system, a plurality of non-measurement multi-qubit quantum logic operations that propagate errors between the at least one syndrome qubit and the plurality of auxiliary qubits so as to reduce the probability of an error affecting the at least one syndrome qubit; and,
   performing, by the control system, syndrome extraction using the at least one syndrome qubit.

2. The method of claim 1, wherein performing the plurality of non-measurement multi-qubit quantum logic operations comprises performing, by the control system, the following gates:
   a first CNOT gate controlled by the at least one syndrome qubit and acting on a first auxiliary qubit of the plurality of auxiliary qubits;
   a second CNOT gate controlled by the at least one data qubit and acting on a second auxiliary qubit of the plurality of auxiliary qubits; and,
   a Toffoli gate controlled by the first and second auxiliary qubits and acting on the at least one syndrome qubit.

3. The method of claim 1, wherein performing the plurality of non-measurement multi-qubit quantum logic operations comprises performing, by the control system, the following gates:
   a first CNOT gate controlled by the at least one syndrome qubit and acting on a first auxiliary qubit of the plurality of auxiliary qubits; then
   a first Toffoli gate controlled by the at least one syndrome qubit and the first auxiliary qubit and acting on a second auxiliary qubit of the plurality of auxiliary qubits; and then,
   a Toffoli gate controlled by the first and second auxiliary qubits and acting on the at least one syndrome qubit.

4. The method of claim 1, wherein performing the plurality of non-measurement multi-qubit quantum logic operations comprises performing, by the control system, gate sequences logically equivalent to the gate sequences in any of FIG. 3a, 3b, 4, 5a, 5b, 6, 7, 11 or 13.

5. The method of claim 1, further comprising concatenating the plurality of non-measurement multi-qubit quantum logic operations.

6. The method of claim 1, wherein the respective initial states are 10> states and wherein the error is a bitflip error.

7. The method of claim 1, wherein the auxiliary qubits are not measured.

8. A quantum computing system comprising:
   a control system; and,
   a quantum processing unit having a plurality of qubits,
   wherein the control system is configured to:
      prepare at least one syndrome qubit and a plurality of auxiliary qubits of the plurality of qubits in respective initial states, wherein each of the at least one syndrome qubit and the plurality of auxiliary qubits has a respective probability greater than zero and less than one half of being prepared with an error;
      perform a plurality of non-measurement multi-qubit quantum logic operations that propagate errors between the at least one syndrome qubit and the plurality of auxiliary qubits so as to reduce the probability of an error affecting the at least one syndrome qubit; and
      perform syndrome extraction using the at least one syndrome qubit.

\* \* \* \* \*